Sept. 26, 1933.                R. PAXTON ET AL                    1,928,460
                            ELECTRICAL SWITCH GEAR
                              Filed Sept. 10, 1931
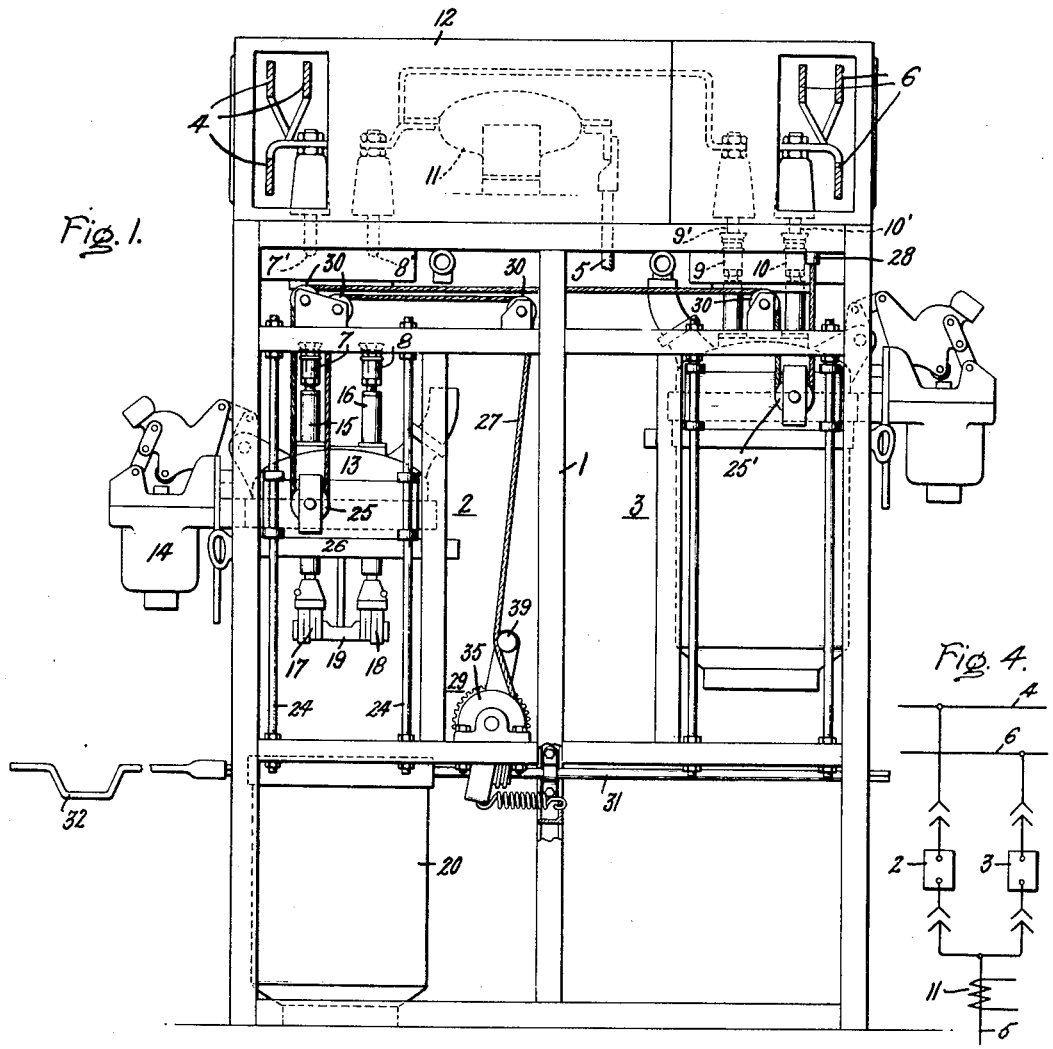
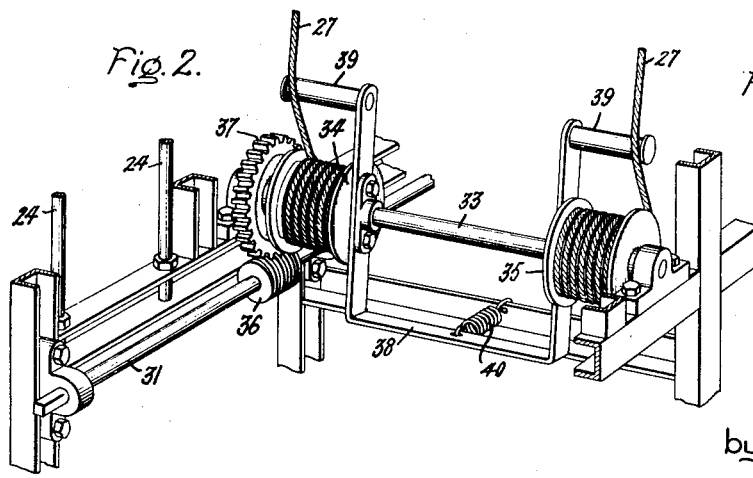
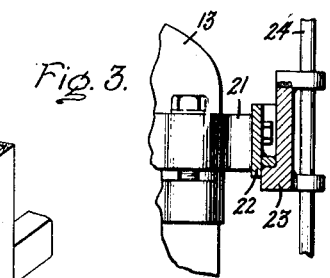
Inventors:
Robert Paxton;
Charles H. Hill,
by *Charles M. Mullen*
Their Attorney.

Patented Sept. 26, 1933

1,928,460

UNITED STATES PATENT OFFICE 1,928,460

ELECTRICAL SWITCH GEAR

Robert Paxton and Charles H. Hill, Drexel Hill, Pa., assignors to General Electric Company, a corporation of New York Application September 10, 1931
Serial No. 562,136

7 Claims. (Cl. 175—298)

Our invention relates to electrical switchgear, more particularly to electrical switchgear of the metal clad type wherein a plurality of circuits, as main and auxiliary buses, may be connected through circuit breakers to a branch circuit, and has for its object the provision of improved switchgear of the aforesaid type.

A further object of our invention is the provision of improved switchgear of the aforesaid type having operating means common to each of the circuit breakers.

A further object of our invention is the provision of improved metal clad switchgear of the double-bus, drop-down type wherein the elevating mechanism is greatly simplified and controls both circuit breakers through common operating means.

Our invention will be more fully set forth in the following description referring to the accompanying drawing, and the features of novelty which characterize our invention will be pointed out with particularity in the claims annexed to and forming a part of this specification.

Referring to the drawing, Fig. 1 is an elevational view, partly in section, of metal clad switchgear embodying our invention; Fig. 2 is an enlarged view in perspective of part of the elevating mechanism shown in Fig. 1; Fig. 3 is a detailed fragmentary view of circuit breaker construction, and Fig. 4 is a diagrammatic illustration of the circuit connections.

In a double bus arrangement wherein continuity of service together with circuit breaker protection is required a pair of circuit breakers is used to connect the corresponding buses to a branch circuit, as a feeder connection, so that one breaker may be disconnected from the circuit at any time for inspection or repair. In other words, the branch circuit may be fed through either breaker while the other is disconnected and out of the circuit. Heretofore the usual disconnecting operation in a well known type of metal clad switchgear involved moving a truck underneath a breaker to be disconnected and lowering the breaker by means carried by the truck. The added cost of the truck and the time involved in the operation of a double bus arrangement render this method objectionable under certain conditions.

The metal clad switchgear unit embodying our invention shown in Fig. 1 comprises a stationary supporting frame 1, suitably constructed of steel angle and channel members, for example, and a pair of circuit breakers 2 and 3 supported by and guided for bodily vertical movement within the frame 1. In the elevated or connected positions the circuit breaker 2 connects a circuit, as the main bus 4, to a branch circuit, as the feeder cable 5, and the circuit breaker 3 connects another circuit, as the auxiliary bus 6, to the branch circuit or cable 5. The actual connections are effected through the usual disconnecting contacts for this type of switchgear, the circuit breaker 2 having mounted thereon socket contacts 7 and 8 coacting with the stationary plug contacts 7' and 8' connected to the main bus and feeder cable respectively. The circuit breaker 3 in like manner is connected to the auxiliary bus 6 and feeder cable 5 through the movable disconnecting contacts 9, 10 and the coacting stationary contacts 9' and 10'.

The main and auxiliary bus bars and the feeder cable, together with the usual current transformer 11 are suitably mounted on the upper part of the frame 1 within a metallic housing 12, the present arrangement being for a three phase circuit. The circuit connections are likewise diagrammatically shown in Fig. 4, each bus being arranged to be connected through a circuit breaker to the feeder cable so that continuity of service is assured if one breaker is taken out and the feeder may be transferred from one bus to the other without interrupting the feeder service.

The circuit breakers are similar in construction and are mounted back-to-back within the frame 1 in the same manner so that a detailed description of the structure and operation of a single breaker is sufficient. The circuit breaker 2, for example, comprises a cover or dome member 13 on which is mounted suitable operating mechanism, as the solenoid operator 14, and the conductor bushings 15 and 16 terminating at the upper portions in the disconnecting contacts 7 and 8, and at the lower portions in the stationary circuit breaker contacts 17 and 18, respectively, which are connected in the closed circuit position by the movable bridging member 19. In the position illustrated the oil tank 20, which is normally detachably supported by the dome member 13, is detached so that the switch contact structure which is normally immersed in oil may be readily inspected.

The supporting and guiding means for the circuit breaker is partly shown in Fig. 3, the supporting flange 21 of the dome 13 being provided with a bar 22 which seats on a corresponding plate member 23 guided for vertical movement in the frame by a pair of rods 24. As indicated in Fig. 1 there are two guide rods 24 secured to the frame 1 at each side of the breaker. Each supporting plate 23 is provided with a pulley 25 for elevating and lowering the breaker in a manner hereinafter described, and the breaker is locked to the frame 1 in its connected, disconnected, or test positions by the manually operated locking bar 26. The locking bar 26 slides within corresponding notches in the frame 1 and supports the plate 23 in both the disconnected and connected positions as clearly illustrated in Fig. 1. The locking bar may likewise be interlocked with the operating mechanism so that a predetermined sequence of operation must take place. This arrangement forms no part of the present invention and is described and claimed in U. S. Patent 1,859,088.

For the purpose of effecting bodily vertical movement of the circuit breakers 2 and 3, operating mechanism common to both breakers elevating or lowering either breaker independently of the position of the other, is provided comprising a cable 27 secured at one end, as at 28, to the frame 1 and connected at its other end to an irreversible gear drive 29. The cable 27 extends through the supporting pulleys 25 and 25' associated with the breakers 2 and 3 respectively and is guided by the stationary idler pulleys 30 mounted on the frame 1. For the purpose of simplicity but a single cable 27 is shown, it being understood that a pair of cables are preferably connected to the pulleys on the supporting plates 23 at opposite sides of each breaker.

Referring more particularly to the gear drive 29, there is provided an operating shaft 31 suitably journaled in the frame 1 and arranged to be rotated from either side of the unit, as by a manually operated crank 32. Rotation of the shaft 31 causes rotation of the counter shaft 33 and cable drums 34 and 35 secured thereto through the irreversible worm and gear connections 36—37. It will be apparent that rotation of the cable drums 34 and 35 causes corresponding elevation or lowering of one of the circuit breakers when the other is locked in position. The worm and gear drive 36 and 37 is irreversible under the weight of the circuit breakers so that it is self locking. The cable 27 is likewise suitably tensioned at all times by a U-shaped member 38 provided with rollers 39 which exert a predetermined bias on the cable 27 under the influence of spring 40.

The method of operation may be briefly explained as follows: Assuming one breaker, as the breaker 3, to be in the elevated or connected position, lowering of the other breaker to the disconnected or test position may be accomplished by simply sliding out the locking bar 26 and rotating the operating shaft 31 so as to permit lowering of the breaker 2. In view of the fact that the circuit breaker 3 is locked to the frame 1, the pulley 25' remains stationary and serves as an idler so that the circuit breaker 2 may be readily elevated or lowered without reference to the breaker 3. In the same manner the breaker 3 may be elevated or lowered when the breaker 2 is locked in either its connected or disconnected position. It is therefore possible through a common operating mechanism to elevate or lower either breaker independently of the position of the other.

The circuit breakers shown are of the three phase type, the switch structure and disconnecting contacts of but a single phase being shown for the purpose of clearness. In case it is desired to remove a breaker entirely from the frame, a truck is rolled underneath, the breaker is lowered to the truck, and the supporting plates 23 are lowered further so that the truck and breaker may be rolled out of the frame.

It should be understood that our invention is not limited to specific details of construction and arrangement thereof herein illustrated, and that changes and modifications may occur to one skilled in the art without departing from the spirit of our invention.

What we claim as new and desire to secure by Letters Patent of the United States, is:

1. Electrical switchgear including a stationary frame supporting main and auxiliary buses and a circuit breaker for each bus arranged to connect said bus to a branch circuit, bodily vertical movement of said circuit breakers effecting the connecting and disconnecting operations, means locking said circuit breakers in connected and disconnected positions, said circuit breakers arranged back-to-back and accessible from opposite sides of said frame, means including operating mechanism connected and common to said circuit breakers arranged to elevate or lower one circuit breaker independently of the connected or disconnected position of the other.

2. Electrical switchgear comprising a stationary supporting frame, main and auxiliary buses and a feeder cable mounted in the upper part of said frame, a circuit breaker for each bus guided for bodily vertical movement within said frame, said breaker when elevated connecting the corresponding bus to said cable, means individually locking said circuit breakers to said frame in both the elevated and lowered positions, and means including a cable effecting vertical movement of either breaker independently of the position of the other breaker, said cable secured at one end to said frame and arranged to support each of said breakers.

3. Electrical switchgear comprising a supporting frame in which a circuit breaker is mounted for bodily vertical movement to connected and disconnected positions with respect to associated circuits, a pair of plates guided for vertical movement in said frame, said plates detachably supporting said circuit breaker at opposite sides thereof, and elevating means for said breaker comprising a pulley connected to each of said supporting plates and a cable operatively connected to each pulley, each cable being secured at one end to said frame and at its other end to driving means.

4. An electrical switchgear unit of the double bus type comprising a stationary supporting frame including a metallic housing, main bus structure mounted in said housing and extending along one side thereof, auxiliary bus structure mounted in and extending along the opposite side of said housing, a feeder cable extending within said housing intermediate said main and auxiliary bus structures, a circuit breaker mounted for vertical movement within said frame for connecting said cable to said main bus structure, a second circuit breaker similarly mounted within said frame for connecting said cable to said auxiliary bus structure, said breakers mounted back-to-back within said frame so as to be accessible at opposite sides of said unit, means locking each of said breakers in the connected and disconnected positions with respect to the aforesaid bus structure, and means common and operatively connected to each of said breakers for moving an individual breaker to connected or disconnected position while the other breaker is locked in its connected or disconnected position.

5. An electrical switchgear unit of the double bus type comprising a stationary supporting frame, main and auxiliary bus structure and a feeder cable mounted on and at the upper part of said frame, a circuit breaker mounted for vertical movement within said frame for connecting said cable to said main bus structure, a second circuit breaker similarly mounted within said frame for connecting said cable to said auxiliary bus structure, said breakers mounted back-to-back within said frame so as to be accessible at opposite sides of said unit, means bodily locking each of said breakers in the connected and disconnected positions with respect to the aforesaid bus structure, and bus transfer operating means common to said breakers for elevating and lowering the same including a cable connected to an operating shaft, said shaft being operable at either of the aforesaid opposite sides of said unit.

6. A metal-clad, double-bus electrical switchgear unit comprising a stationary supporting frame, metal enclosed main bus and auxiliary bus structures mounted at the upper part of said frame, a feeder cable having metal enclosed connections associated with said main and auxiliary bus structures, an oil circuit breaker mounted and guided for bodily vertical movement within said frame for connecting and disconnecting said cable with respect to said main bus structure, a second oil circuit breaker similarly mounted within said frame for connecting and disconnecting said cable with respect to said auxiliary bus structure, said breakers mounted back-to-back within said frame so as to be accessible at opposite sides thereof, and means locking separately each of said breakers to said frame in the connected and disconnected positions of said breakers.

7. A metal-clad, double-bus electrical switchgear unit comprising a fabricated supporting frame, a metallic housing mounted at and extending across the upper part of said frame, main bus structure mounted in said housing at one side of said frame, auxiliary bus structure mounted in said housing at the opposite side of said frame, a feeder cable extending within said housing intermediate said main and auxiliary bus structures, a circuit breaker mounted and guided for bodily vertical movement within said frame for connecting said feeder cable to said main bus structure, a second circuit breaker similarly mounted within said frame for connecting said cable to said auxiliary bus structure, said breakers mounted back-to-back within said frame and beneath the corresponding bus structures so as to be accessible at opposite sides of said frame, means locking separately each of said breakers to said frame in the connected and disconnected positions, and means for effecting bodily vertical movement of said circuit breakers.

ROBERT PAXTON.
CHARLES H. HILL.